United States Patent
Lim et al.

(10) Patent No.: US 12,535,812 B2
(45) Date of Patent: Jan. 27, 2026

(54) SMALL ROBOT CAPABLE OF RUNNING AND CONTROL METHOD THEREOF

(71) Applicant: SAMSUNG ELECTRONICS CO., LTD., Suwon-si (KR)

(72) Inventors: Baeseok Lim, Suwon-si (KR); Donghan Koo, Suwon-si (KR); Woosub Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 18/234,712

(22) Filed: Aug. 16, 2023

(65) Prior Publication Data

US 2024/0036576 A1 Feb. 1, 2024

Related U.S. Application Data

(63) Continuation of application No. PCT/KR2023/009491, filed on Jul. 5, 2023.

(30) Foreign Application Priority Data

Jul. 27, 2022 (KR) .......... 10-2022-0093541
Oct. 7, 2022 (KR) .......... 10-2022-0128704

(51) Int. Cl.
*G05D 1/00* (2024.01)

(52) U.S. Cl.
CPC .................... *G05D 1/021* (2013.01)

(58) Field of Classification Search
CPC ....................................... G05D 1/021
See application file for complete search history.

(56) References Cited

U.S. PATENT DOCUMENTS

| 7,554,787 | B2 | 6/2009 | Pelrine et al. |
| 7,957,837 | B2 | 6/2011 | Ziegler et al. |
(Continued)

FOREIGN PATENT DOCUMENTS

| CN | 104442191 A | 3/2015 |
| CN | 107009816 A | 8/2017 |
(Continued)

OTHER PUBLICATIONS

International Search Report (PCT/ISA/210) issued by the International Searching Authority on Oct. 24, 2023 in International Application No. PCT/KR2023/009491.
(Continued)

*Primary Examiner* — Wade Miles
*Assistant Examiner* — Aaron G Cain
(74) *Attorney, Agent, or Firm* — Sughrue Mion, PLLC

(57) ABSTRACT

A robot includes: a body portion; at least one sensor provided in the body portion; a first wheel and a second wheel provided on opposite sides of the body portion and configured to rotate; a first driver configured to rotate the first wheel and the second wheel with respect to a first rotation axis; a second driver configured to eccentrically rotate the first wheel and the second wheel with respect to a second rotation axis; and at least one processor configured to: control the first driver and the second driver to cause the robot to move along a route by rotating the first wheel and the second wheel, identify, based on sensing data obtained through the at least one sensor, an obstacle for climbing on the route, and based on identifying the obstacle, control the second driver to eccentrically rotate the first wheel and the second wheel with respect to the second rotation axis, and to shift the first wheel and the second wheel in a direction from a first position to a second position to increase a size of a wheel base of the robot.

16 Claims, 15 Drawing Sheets

(56) References Cited

U.S. PATENT DOCUMENTS

| | | |
|---|---|---|
| 9,908,432 B2 | 3/2018 | Park et al. |
| 11,213,763 B2 | 1/2022 | Hayashi |
| 2011/0260417 A1* | 10/2011 | Bitzer .................... A61G 5/061 |
| | | 280/5.2 |
| 2012/0303160 A1* | 11/2012 | Ziegler ................ G05D 1/0246 |
| | | 700/259 |
| 2013/0268118 A1* | 10/2013 | Grinstead ............ G05D 1/0022 |
| | | 700/259 |
| 2015/0129328 A1 | 5/2015 | Behrens |
| 2016/0259336 A1 | 9/2016 | Lee et al. |
| 2019/0126157 A1 | 5/2019 | Hayashi |
| 2021/0245081 A1* | 8/2021 | Kumar ................. A47L 9/0494 |
| 2022/0330769 A1 | 10/2022 | Lee et al. |
| 2023/0226870 A1 | 7/2023 | Jang |

FOREIGN PATENT DOCUMENTS

| | | |
|---|---|---|
| CN | 107336574 A | 11/2017 |
| JP | 2005-186920 A | 7/2005 |
| JP | 2019-63543 A | 4/2019 |
| KR | 10-0783134 B1 | 12/2007 |
| KR | 10-2016-0107663 A | 9/2016 |
| KR | 10-2022-0009305 A | 1/2022 |
| KR | 10-2022-0044317 A | 4/2022 |
| KR | 10-2022-0067627 A | 5/2022 |
| KR | 10-2512393 B1 | 3/2023 |

OTHER PUBLICATIONS

Written Opinion (PCT/ISA/237) issued by the International Searching Authority on Oct. 24, 2023 in International Application No. PCT/KR2023/009491.

Communication dated Apr. 29, 2025 issued by the European Patent Office in European Patent Application No. 23846851.6.

* cited by examiner

SMALL ROBOT CAPABLE OF RUNNING AND CONTROL METHOD THEREOF

CROSS-REFERENCE TO RELATED APPLICATIONS

This application is a bypass continuation of International Application No. PCT/KR2023/009491, filed on Jul. 5, 2023, which is based on and claims priority to Korean Patent Application No. 10-2022-0093541, filed Jul. 27, 2022, in the Korean Intellectual Property Office and Korean Patent Application No. 10-2022-0128704, filed Oct. 7, 2022, in the Korean Intellectual Property Office, the disclosures of which are incorporated by reference herein in their entireties.

BACKGROUND

1. Field

The disclosure relates to a small robot capable of running and a control method thereof and, more specifically, to a robot for climbing an obstacle by eccentrically rotating a wheel of a robot, and a control method therefor.

2. Description of the Related Art

Development of electronic technology has led to development and supply of various types of electronic devices, and recently, technology development for a robot providing a service to a user has been actively developed. In the case of a robot running in a specific space in order to provide a service to a user, a situation in which the robot is climbing over an obstacle in a running route may occur.

In the case of a spherical robot, a situation in which the robot is overturned in a direction opposite to the running direction may occur when climbing the obstacle due to the morphological characteristics of the robot. When the robot is overturned, the robot becomes unable to provide a service to the user, and the user may be required to take the inconvenient step of making the robot stand again. Accordingly, there is a need for a method for a robot to climb an obstacle in a running route while preventing the robot from being overturned.

SUMMARY

According to an aspect of the disclosure, a robot includes: a body portion; at least one sensor provided in the body portion; a first wheel and a second wheel provided on opposite sides of the body portion and configured to rotate; a first driver configured to rotate the first wheel and the second wheel with respect to a first rotation axis; a second driver configured to eccentrically rotate the first wheel and the second wheel with respect to a second rotation axis; and at least one processor configured to: control the first driver and the second driver to cause the robot to move along a route by rotating the first wheel and the second wheel.

The at least one processor configured to identify, based on sensing data obtained through the at least one sensor, an obstacle for climbing on the route, The at least one processor configured to, based on identifying the obstacle, control the second driver to eccentrically rotate the first wheel and the second wheel with respect to the second rotation axis, and to shift the first wheel and the second wheel in a direction from a first position to a second position to increase a size of a wheel base of the robot.

According to an aspect of the disclosure, a method of controlling a robot including a body portion, first and second wheels provided on opposite sides of the body portion, a first driver, a second driver, and at least one sensor, includes: controlling at least one of the first driver and the second driver to cause the robot to move along a route by rotating the first wheel and the second wheel with respect to at least one of a first rotation axis or a second rotation axis of each of the first wheel and the second wheel.

The method may further include: identifying, based sensing data obtained through the at least one sensor, an obstacle for climbing on the route.

The method may further include: based on identifying the obstacle, controlling the second driver to eccentrically rotate the first wheel and the second wheel with respect to the second rotation axis, and shift the first wheel and the second wheel in a direction from a first position to a second position to increase in a size of a wheel base of the robot.

According to an aspect of the disclosure, a non-transitory computer readable recording medium stores instructions which are executable by a processor to perform a method of operating a robot including a body portion, first and second wheels provided on opposite sides of the body portion, a first driver, a second driver, and at least one sensor, the method including: controlling at least one of the first driver and the second driver to cause the robot to move along a route by rotating the first wheel and the second wheel with respect to at least one of a first rotation axis or a second rotation axis of each of the first wheel and the second wheel;

The method may further include, identifying, based sensing data obtained through the at least one sensor, an obstacle for climbing on the route;

The method may further include, based on identifying the obstacle, controlling the second driver to eccentrically rotate the first wheel and the second wheel with respect to the second rotation axis, and shift the first wheel and the second wheel in a direction from a first position to a second position to increase in a size of a wheel base of the robot.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
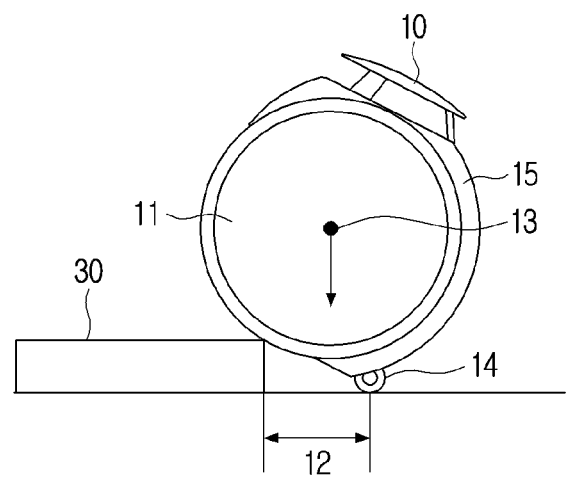
FIGS. 1A and 1B are diagrams schematically illustrating a method of controlling a robot according to one or more embodiments.

Embodiments of the disclosure will be described in detail below with reference to the attached drawings.

The terms used in this specification will be briefly described, and the disclosure will be described in detail.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

In this disclosure, terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Also, in the disclosure, a "deep neural network (DNN)" is a representative example of an artificial neural network model simulating brain nerves, and is not limited to an artificial neural network model using a specific algorithm.

Also, in the disclosure, a "parameter" is used in a calculation process of each layer constituting a neural network, and may include, for example, a weight used when applying an input value to a predetermined calculation formula. In addition, the parameter may be expressed in a matrix form. The parameter is a value set as a result of the training, and may be updated through separate training data if necessary.

Figure 1B:
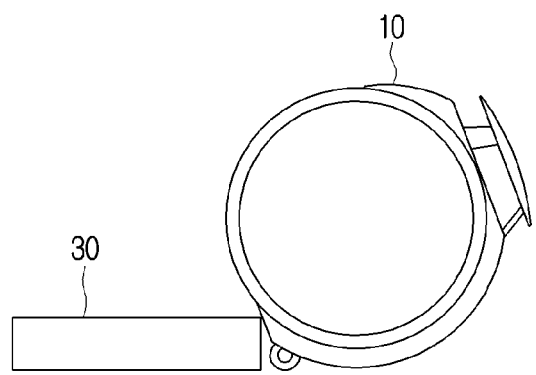

FIGS. 1A and 1B are diagrams schematically illustrating a method of controlling a robot according to one or more embodiments.

Referring to FIG. 1A, according to one or more embodiments, a robot 10 may pre-store map information corresponding to a running space in order to run in a space, and may run in a space by identifying a running route based on the map information. According to one or more embodiments, the robot 10 may generate a minimum time path or a shortest distance path for reaching a destination based on pre-stored map information.

According to one or more embodiments of the disclosure, the robot 10 may be a ball-shaped robot, but is not limited thereto, and may be a small robot running on a running route by using a wheel. According to one or more embodiments, the small robot may be a robot having a height of less than 30 cm, but is not limited thereto.

According to one or more embodiments, the robot 10 may include a body portion 15 and a wheel 11. According to one example, the body portion 15 may constitute a central portion of the robot 10. A pair of wheels 11 may be provided on both sides of the body portion 15. That is, a left wheel (or, a first wheel) may be provided at the left side of the body portion 15, and a right wheel (or, a second wheel) may be provided at the right side of the body portion 15. For example, the left wheel and the right wheel may be provided to be symmetrical to each other with respect to the central axis of the body portion 15.

The wheel 11 including a left wheel and a right wheel may be provided to be rotatable 360 degrees, respectively. Each of the left wheel and the right wheel may be provided with a contact member provided in a portion adjacent to the body portion 15. For example, the contact member may be provided to surround a portion of the outer surface of the left wheel and the right wheel and be in contact with the ground. Accordingly, the robot 10 may move forward or backward according to the rotation of the left wheel and the right wheel. The wheel 11 including a left wheel and a right wheel according to the disclosure may be a front wheel of the robot 10 according to an example.

According to one or more embodiments, the robot 10 may climb an obstacle by rotating the wheel 11 provided in the robot 10 based on a rotation axis 13 of the robot 10 when an obstacle for climbing is identified on the identified running route. For example, when an obstacle is identified on a running route, the robot 10 may identify whether the obstacle is a climbing target or an avoidance target based on characteristics (e.g., height, size, etc.) of the obstacle.

According to one or more embodiments, the robot 10 may include a separate rear wheel 14. When the robot 10 climbs the obstacle 30 as shown in FIG. 1A, when the center of gravity of the robot 10 is located behind the rear wheel 14 as the distance 12 between the obstacle 30 and the rear wheel 14 decreases, a situation in which the robot 10 does not climb the obstacle 30 and is overturned backward may occur as shown in FIG. 1B. Accordingly, various embodiments in which the robot 10 may smoothly climb the obstacle 30 without being overturned backward is described below.

At least one configuration and/or operation included in various embodiments described below may be substituted with at least one configuration and/or operation included in another embodiment. In addition, at least one configuration and/or operation included in various embodiments may be additionally included in another embodiment. That is, the various embodiments described below are not an embodiment separated from each other, and at least some components included in each embodiment may be combined with each other.

Figure 2:
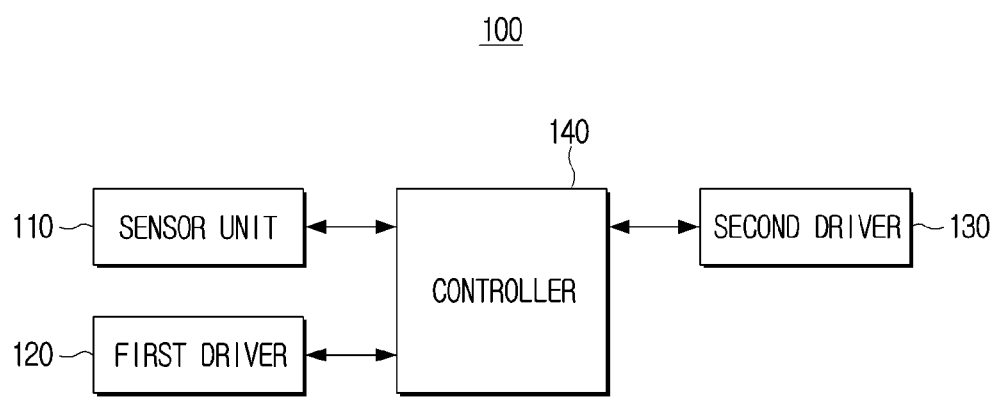
FIG. 2 is a block diagram illustrating a configuration of a robot according to one or more embodiments.

FIG. 2 is a block diagram illustrating a configuration of a robot according to one or more embodiments.

Referring to FIG. 2, a robot 100 may include a sensor unit 110, a first driver 120, a second driver 130, and a controller 140.

The sensor unit 110 may include a plurality of sensors of various types. The sensor unit 110 may measure a physical quantity or detect an operation state of the robot 100 to convert the measured or detected information into an electrical signal. The sensor unit 110 may include a camera, and the camera may include a lens for focusing visible light and/or other optical signals reflected and received by an object to an image sensor and an image sensor capable of sensing visible light and/or other optical signals. Here, the image sensor may include a 2D pixel array divided into a plurality of pixels. A camera according to one or more embodiments may be implemented by a depth camera. In addition, according to one or more embodiments, the sensor unit 110 may include a thermal image sensor for reading a shape as well as a distance sensor such as a Light Detection And Ranging (LiDAR) sensor and a Time of Flight (TOF) sensor.

In an example embodiment, the sensor unit 110 may include a rotary encoder, and one or more controllers or processors 140 may obtain information about revolutions per minute (RPM) of both wheels (FIGS. 1, 11) provided in the robot 100 through a rotary encoder.

Alternatively, the sensor unit 110 may include an inertial measurement unit (IMU) sensor, and the controller 140 may obtain data about an incline (or a degree of incline) of the robot 100 through the IMU sensor.

The wheel 11 including a left wheel and a right wheel according to the disclosure may be a front wheel of the robot 100 according to an example. Hereinafter, for convenience of description, a left wheel and a right wheel may be referred to as wheels 11. In the disclosure, the wheel 11 denotes a wheel controlled by a driver, for example, the first driver 120 and the second driver 130, and the rear wheel 14 shown in FIG. 1 is assumed to be distinguished from the wheel 11.

A driver 120, 130 including a first driver 120 and a second driver 130 is a device capable of driving the robot 100. The drivers 120, 130 may adjust a running direction and a running speed according to the control of the one or more controllers 140. The drivers 120, 130 according to one or more embodiments may include a power generation device (e.g., a gasoline engine, a diesel engine, a liquefied petroleum gas (LPG) engine, an electric motor, etc.) depending on a fuel (or energy source) for use for generating power for the robot 100 to run. Here, the drivers 120, 130 may be implemented in various ways according to a running type (e.g., a wheel type, a walking type, etc.) of the robot 100.

According to one or more embodiments, the first driver 120 may rotate the wheel 11. According to one or more embodiments, the first driver 120 may be coupled to one side of a coupling unit to rotate the wheel 11 coupled to the other side of the coupling unit. That is, when the first driver 120 rotates, a coupling unit coupled to one side of the first driver 120 rotates, and thus the wheel 11 coupled to the remaining one side of the connection member rotates.

According to one or more embodiments, a plurality of first drivers 120 may be implemented and provided on both sides of the body portion 15, respectively. For example, one of the plurality of first drivers 120 may be provided on the left side of the body portion 15, and the other one of the plurality of first drivers 120 may be provided on the right wheel of the body portion 15. The combination of the first driver 120, the coupling unit, and the wheel 11 will be described in detail with reference to FIGS. 5B and 5C.

According to one or more embodiments, the center of the wheel 11 may be located on the rotation axis (or the first rotation axis) of the first driver 120, and when the first driver 120 rotates around the rotation axis of the first driver 120, the coupling unit coupled to the first driver 120 is also rotated around the rotation axis of the first driver 120, and accordingly, the wheel 11 coupled to the coupling unit is also rotated around the rotation axis of the first driver 120. That is, the first driver 120 may rotate both wheels 11 by using the center of the wheel as a rotation axis.

According to one or more embodiments, the second driver 130 may rotate the wheel 11.

According to one or more embodiments, the second driver 130 may be provided on one side of the body portion 15. The second driver 130 may be coupled to one side of the connection member to rotate the first driver 120 coupled to the other side of the connection member. Accordingly, a coupling unit coupled to one side of the first driver 120 rotates, and the wheel 11 coupled to the other side of the coupling unit also rotates. The combination of the second driver 130, the connection member, and the wheel 11 will be described in detail with reference to FIGS. 5B and 5C.

According to one or more embodiments, a plurality of second drivers 130 may be implemented and provided on both sides of the body portion 15, respectively. One of the plurality of second drivers 130 may be provided on the left side of the body portion 15. The other one of the plurality of second drivers 130 may be provided on the right side of the body portion 15.

According to one or more embodiments, the rotation axis of the second driver 130 may be provided at a location spaced apart from the rotation axis of the first driver 120 by a predetermined distance. For example, the rotation axis (or the second rotation axis) of the second driver 130 is provided at a location spaced apart by 10 cm from the center of the wheel (or the center of the wheel located on the rotation axis of the first driver 120) so as to rotate the left wheel and the right wheel 11 based on the location. That is, the rotation axis of the first driver 120 and the rotation axis of the second driver 130 may be different. In other words, the first rotation axis may correspond to a central location of the wheel 11, and the second rotation axis may correspond to a location spaced apart from the center of the wheel by a preset distance, but is not limited thereto.

The controller 140 is electrically connected to the sensor unit 110 and the driver (120, 130) for controlling overall operations of the robot 100. The controller 140 may be composed of one or a plurality of processors. To be specific, the controller 140 may perform an operation of the robot 100 according to various embodiments of the disclosure by executing at least one instruction stored in a memory (e.g., memory 195).

The controller or at least one processor 140 may include one or more of a Central Processing Unit (CPU), a Graphics Processing Unit (GPU), an Accelerated Processing Unit (APU), a Many Integrated Core (MIC), a Digital signal Processor (DSP), a Neural Processing Unit (NPU), a hardware accelerator, or a machine learning accelerator. The controller 140 may control one or any combination of other components of the robot, and may perform an operation or data processing relating to communication. The controller 140 may execute one or more programs or instructions stored in a memory. For example, the controller 140 may perform a method according to one or more embodiments of the disclosure by executing at least one instruction stored in a memory.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all the first operation, the second operation, and the third operation may be performed by the first processor, the first operation and the second operation may be performed by the first processor (for example, a general purpose processor), and the third operation may be performed by the second processor (for example, an artificial intelligence dedicated processor).

The controller 140 may be implemented as a single core processor including one core, or may be implemented as one or more multicore processors including a plurality of cores (for example, homogeneous multicores or heterogeneous multicores). When the controller 140 is implemented as a multicore processor, each of the plurality of cores included in the multicore processor may include a processor internal memory such as a cache memory and an on-chip memory, and a common cache shared by the plurality of cores may be included in the multicore processor. In addition, each of a plurality of cores included in a multicore processor (or a part of a plurality of cores) may independently read and perform a program instruction for implementing a method according to one or more embodiments of the disclosure, and a program instruction for implementing a method according to one or more embodiments of the disclosure may be read through connection of all (or a part of) a plurality of cores.

When a method according to one or more embodiments of the disclosure includes a plurality of operations, a plurality of operations may be performed by one core among a plurality of cores included in a multicore processor or may be performed by a plurality of cores. For example, when a first operation, a second operation, and a third operation are performed by a method according to one or more embodiments, all of a first operation, a second operation, and a third operation may be performed by a first core included in the multicore processor, and the first operation and the second operation may be performed by a first core included in the multicore processor and the third operation may be performed by a second core included in the multicore processor.

In embodiments of the disclosure, the processor may mean a system-on-chip (SoC) in which one or more processors and other electronic parts are integrated, a monocore processor, or a core included in a single core processor or a multicore processor, wherein the core may be implemented as a CPU, a GPU, an APU, a MIC, a DSP, an NPU, a hardware accelerator, or a machine learning accelerator, but embodiments of the disclosure are not limited thereto.

According to one or more embodiments, the controller 140 may make the robot 100 run by rotating a wheel provided in the robot 100. According to one or more embodiments, the controller 140 may control the first driver 120 such that the robot 100 runs along the running route by rotating the left wheel and the right wheel 11.

According to one or more embodiments, the robot 100 may pre-store map information corresponding to a running space in order to run in a space, and may run in a specific space by identifying a running route based on the map information and the location of the target point.

According to one or more embodiments, the controller 140 may identify whether an obstacle for climbing is present on a running route. According to one or more embodiments, the controller 140 may identify whether an obstacle for climbing is present on a running route based on sensing data obtained through the sensor unit 110. For example, when an obstacle is identified on a running route based on sensing data obtained through the sensor unit 110, the robot 10 may identify whether the obstacle is a climbing target or an avoidance target based on characteristics (e.g., height, size, etc.) of the obstacle. Here, the climbing target is an object to be climbed by shifting a left wheel and a right wheel 11 according to one example and excludes a case (for example, a raised spot having a low height) that a robot may climb through simple running.

For example, the controller 140 may identify whether an obstacle for climbing is present within a preset distance (for example, 1 meter) from the robot 100 through an image obtained through a camera. However, the embodiment is not limited thereto, and the controller 140 may identify an obstacle as a climbing target existing at a location of a preset distance or more through an image obtained through a camera. According to one or more embodiments, the controller 140 may control the second driver 130 so that both wheels are eccentrically rotated around a second rotation axis when an obstacle for climbing is identified. Here, the eccentricity may mean that the action of the force deviates from the central axis of the wheel. The eccentric rotation may mean rotating the wheel by using a location spaced apart from a center (or a central location) of each wheel 11 by a predetermined distance as a rotation axis. For example, since the location of the second rotation axis is spaced apart from the center of the wheel by a predetermined distance, both wheels may be eccentrically rotated when both wheels are rotated with respect to the second rotation axis. According to one or more embodiments, the second driver 130 may be provided at a location corresponding to the second rotation axis.

According to an example, based on an obstacle for climbing being identified on the running route based on sensing data obtained through the sensor unit 110, the controller 140 may control the second driver 130 such that the left wheel and the right wheel 11 are eccentrically rotated with respect to the second rotation axis, and shift the left wheel and the right wheel 11 in a direction in which a size of a wheel base of the robot 100 increases with respect to the body portion 15 (FIG. 1). Here, the wheel base (or the inter-axis distance) may mean a distance between each center of a front wheel and a rear wheel of the robot 100. Shifting may mean that the center of the wheel 11 moves in one direction from the current location. According to one or more embodiments, when both wheels 11 are shifted in one direction with respect to the body portion 15, the distance between the centers of both wheels 11 and rear wheel 14 increases, thereby increasing the wheel base. In that when the wheel base is increased, the radius of rotation increases and the driving stability and straightness are increased, if the wheels 11 are shifted to increase the size of the wheel base of the robot 100, the probability that the robot 100 is overturned is relatively reduced.

For example, if an obstacle for climbing is identified in a running route by analyzing the obtained sensing data, the controller 140 may control the second driver 130 to rotate the left wheel and the right wheel 11 by a preset rotation angle with respect to the second rotation axis. As the left wheel and the right wheel 11 rotate by a predetermined angle with respect to the second rotation axis, both wheels 11 may be shifted by a predetermined distance with respect to the body portion 15.

According to one or more embodiments, the controller 140 may control the first driver 120 while shifting the two wheels 11 by a predetermined distance to rotate the wheels 11 on both sides with respect to the first rotation axis to climb the obstacle. As the size of the wheel base increases compared before both wheels 11 of the robot 100 are shifted, a relatively stable climbing is possible.

Alternatively, according to one or more embodiments, the controller 140 may perform climbing on an obstacle while shifting only one of the two side wheels 11 by a predetermined distance. According to one or more embodiments, the controller 140 may shift a left wheel by a preset distance and control the first driver 120 to rotate two wheels 11 based on a first rotation axis, thereby climbing the obstacle.

Figure 3:
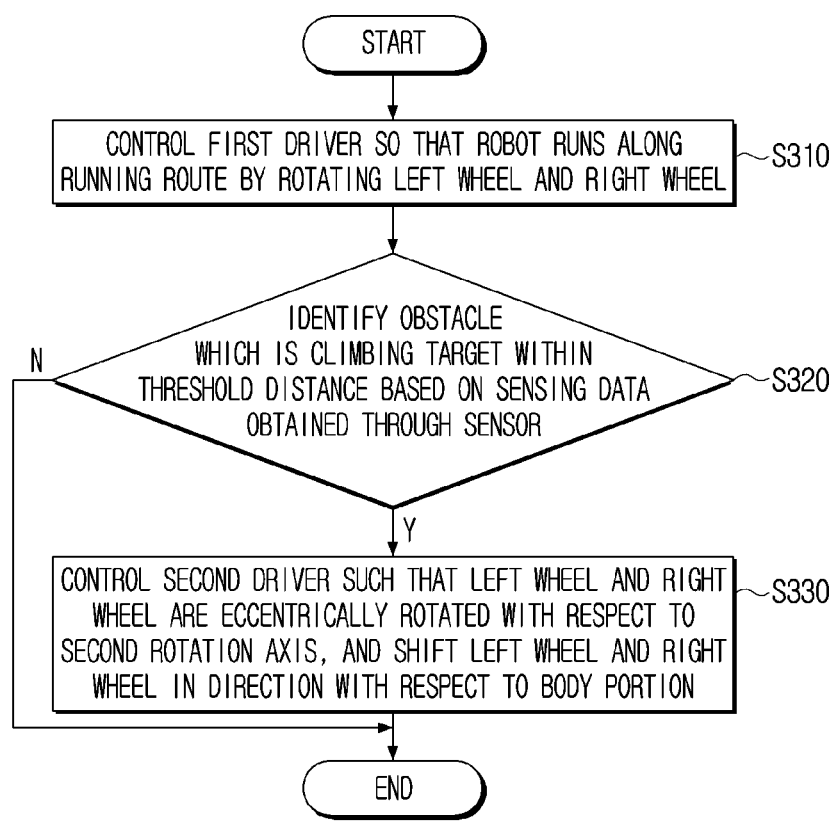
FIG. 3 is a flowchart illustrating a method of a robot climbing an obstacle according to one or more embodiments.

FIG. 3 is a flowchart illustrating a method of a robot climbing an obstacle according to one or more embodiments.

Referring to FIG. 3, the controller 140 according to one or more embodiments may control the first driver 120 so that the robot 100 runs along the running route by rotating the left wheel 11 and right wheel 11 in operation S310.

According to one or more embodiments, the controller 140 may control at least one of the first driver 120 and the second driver 130 to rotate the wheel 11 based on the first rotation axis located at the center of the wheel 11 so that the robot 100 runs along the running route.

According to one or more embodiments, the controller 140 may identify an obstacle which is a climbing target on a running route based on sensing data obtained through the sensor unit 110 in operation S320. According to one or more embodiments, the controller 140 may obtain an image of a running route corresponding to a running route of the robot 100 through a camera sensor.

According to one or more embodiments, the controller 140 may identify an obstacle (for example, a prevention protrusion, a staircase, etc.) to be placed on a running route based on an image of the acquired running route. For example, the controller 140 may analyze a characteristic (e.g., height, size, type, etc.) of an object included in the image to identify whether the object is a climbing target or an avoidance target.

For example, when a step is identified in the acquired image, if it is identified that the identified step has a height value within a preset range based on the acquired image, the controller 140 may identify the identified step as an obstacle for climbing.

For example, when a step is identified in the acquired image, the controller 140 may identify the height value of the step based on the acquired image. When the identified step exceeds a height value within a preset range, the controller 140 may identify the identified step as an obstacle to be avoided.

Thereafter, the controller 140 may identify whether the identified step is present in the running route.

Alternatively, according to an example, the controller 140 may identify whether an obstacle is present on the running route and an obstacle is a climbing target based on a sensor of a type different from the camera sensor.

For example, the controller 140 may identify whether an obstacle for climbing is present on a running route based on sensing information obtained through a light detection and ranging (LiDAR) sensor.

The controller 140 may identify whether an obstacle for climbing is present on a running route based on sensing information obtained through a cliff sensor. The cliff sensor may sense an obstacle on a floor supporting a main body of the robot 100 using various types of optical sensors, and according to an example, the cliff sensor may be an infrared sensor, an ultrasonic sensor, a radio frequency (RF) sensor, or a location sensitive detector (PSD) sensor. The cliff sensor may be disposed on the rear surface of the robot 100 according to an example, but is not limited thereto.

For example, the controller 140 may identify an obstacle existing within a preset distance from a floor (or a rear surface) supporting the main body of the robot 100 based on sensing information acquired through the cliff sensor. When an obstacle is identified within a preset distance from the floor supporting the main body of the robot 100 through the cliff sensor, the controller 140 may control the second driver 130 such that the left wheel and the right wheel 11 are eccentrically rotated and shifted with respect to the second rotation axis.

Alternatively, the controller 140 may identify the height value of the obstacle through the sensing information acquired through the cliff sensor. For example, the controller 140 may calculate an angle value between an emission signal of infrared rays emitted toward the floor surface by the cliff sensor and a reflection signal reflected and received by the obstacle, and calculate a height value of the obstacle based on the angle value. If it is identified that the calculated height value of the obstacle is within a preset range, the controller 140 may identify that the obstacle is a climbing target, and control the second driver 130 such that the left wheel and the right wheel 11 are shifted eccentrically with respect to the second rotation axis.

Alternatively, for example, when an obstacle is identified within a preset distance from the floor supporting the main body based on sensing information acquired through the cliff sensor, the controller may identify the height value of the obstacle through the image acquired through the camera, and may identify whether the obstacle is a climbing target. If the obstacle is identified to be a climbing target, the controller 140 may control the second driver 130 such that the left wheel and the right wheel 11 are shifted eccentrically with respect to a second rotation axis.

That is, the controller 140 may identify an obstacle by using only a cliff sensor, or identify an obstacle by using each of the cliff sensor and a camera sensor (or LiDAR sensor).

Then, according to one or more embodiments, the controller 140 may control the second driver 130 such that the left wheel and the right wheel 11 are shifted eccentrically with respect to a second rotation axis. For example, the controller 140 may shift the left wheel and the right wheel 11 in a direction in which the size of a wheel base increases.

According to one or more embodiments, the controller 140 may control the second driver 130 to eccentrically rotate both side wheels 11 with respect to a second rotation axis existing at a location separated from the center of the wheel 11 by a predetermined distance when it is identified that an obstacle for climbing is located on the running route based on the obtained sensing data (S320 Y).

For example, the controller 140 may eccentrically rotate the wheel 11 by 180 degrees based on a second rotation axis existing at a location spaced apart from the center of both side wheels 11 by a predetermined distance through the second driver 130 so as to shift both side wheels 11 from an existing location by a threshold distance in a running direction.

Alternatively, according to one or more embodiments, the controller 140 may control the second driver 130 to eccentrically rotate both side wheels 11 based on a second rotation axis existing at a location spaced apart from the center of the wheel 11 by a predetermined distance when it is identified that the robot is located from the obstacle within a first threshold distance from an obstacle for climbing based on the acquired sensing data.

For example, when it is identified that an obstacle is located within a first threshold distance (for example, 1 meter) from the robot 100 based on an image acquired through the camera, the controller 140 may control the second driver 130 such that the two wheels 11 are eccentrically rotated with respect to the second rotation axis.

Alternatively, according to one example, when it is identified that an obstacle for climbing is present on a running route based on the acquired sensing data, if it is identified that the robot 100 and the obstacle are within a second threshold distance, the controller 140 may control the second driver 130 so that both wheels 11 are eccentrically rotated based on a second rotation axis.

For example, it is assumed that an obstacle located on a running route exists at a location spaced apart from the robot 100 by a first threshold distance. In this case, the controller 140 may control the first driver 120 such that the robot 100 moves until the distance between the robot 100 and the obstacle becomes a second threshold distance (for example, 10 cm). Subsequently, when it is identified that the obstacle is located within the second threshold distance from the robot 100 based on the sensing data acquired through the sensor unit 110, the controller 140 may control the second driver 130 such that the two wheels 11 are eccentrically rotated with respect to the second rotation axis.

Then, if both wheels 11 are shifted in a direction in which the size of a wheel base increases with respect to the body part 15 according to one or more embodiments, the controller 140 may perform climbing by controlling the first driver 120 so that both side wheels 11 rotate around a first rotation axis.

In this example, the distance from the center of both wheels 11 to the rear wheel 14, that is, the size of the wheel base, is increased as both wheels 11 are shifted from the existing location to the running direction, and accordingly, the robot 100 may climb the obstacle more easily than before.

Figure 4:
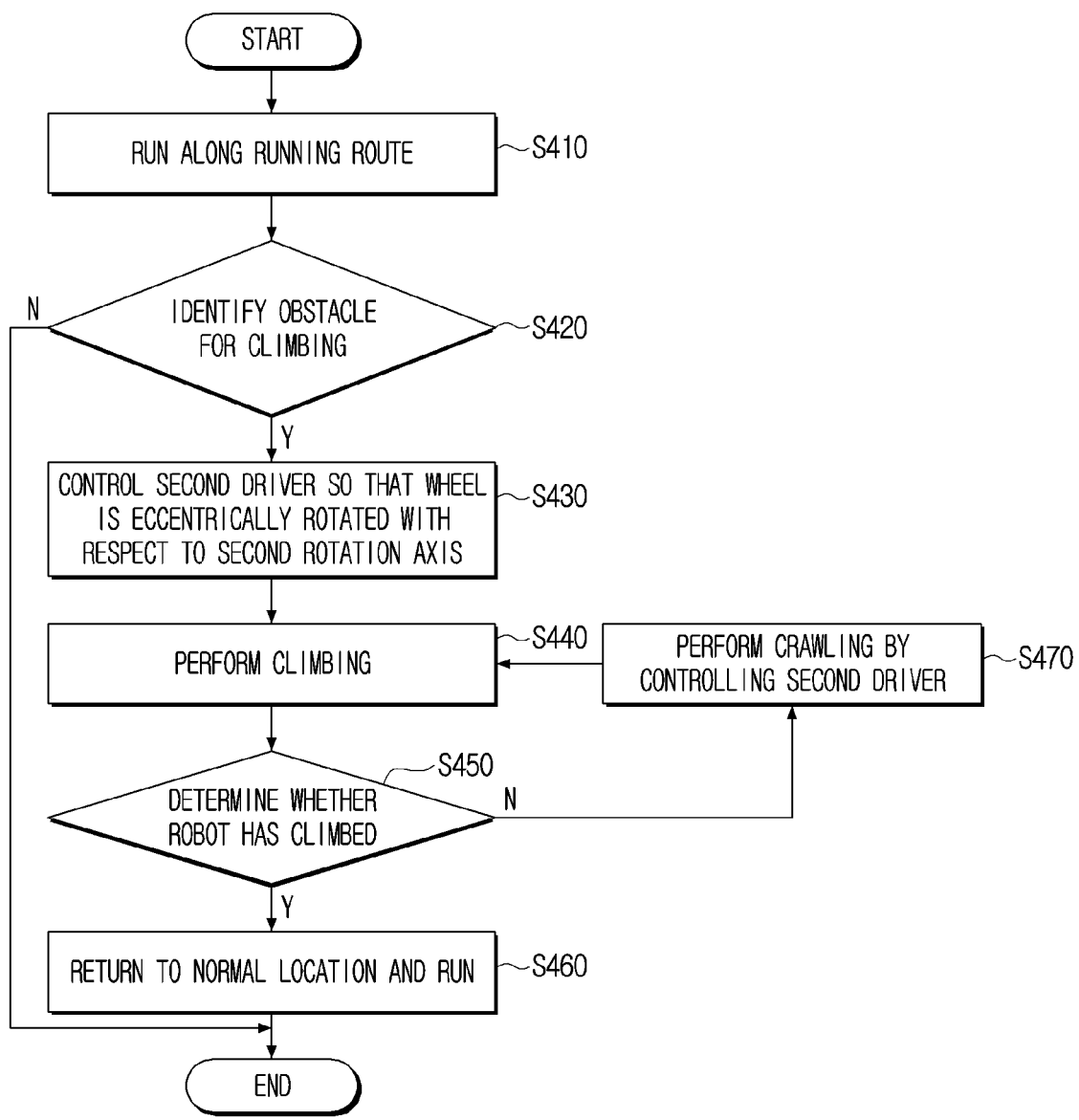
FIG. 4 is a flowchart illustrating a method of a robot climbing an obstacle according to one or more embodiments.

FIG. 4 is a flowchart illustrating a method of a robot climbing an obstacle according to one or more embodiments.

According to one or more embodiments, the controller 140 may make the robot 100 run along a running route in operation S410. According to one or more embodiments, the controller 140 may control the first driver 120 to rotate the left wheel and the right wheel 11 so that the robot 100 runs along the running route.

The control method may identify whether an obstacle for climbing is present on a running route based on the sensing data acquired through the sensor unit 110 in operation S420. According to one or more embodiments, the control method may identify whether the identified step exceeds a preset height when a chin is identified in an image acquired through the sensor unit 110.

However, the embodiment is not limited thereto, and when the sensor unit 110 is implemented as a LiDAR sensor, the control method may identify whether an obstacle for climbing is present on a running route based on data acquired through the LiDAR sensor. The LiDAR sensor may detect a distance from an object (e.g., an obstacle, etc.) around the robot 100. Specifically, the LiDAR sensor rotates 360 degrees, irradiate a laser toward an object around the robot 100, and, when the irradiated laser is reflected from an object around the robot 100 and received, may detect a distance to the object based on the time when the laser is received, or detect the distance from the object by measuring the phase change amount of the received laser.

For example, the controller 140 may acquire a distance value corresponding to an object around the robot 100 obtained through the LiDAR sensor, and may identify whether an obstacle exists on the running route based on the acquired distance value. Subsequently, the controller 140 may identify whether the height value of the identified obstacle is within a preset range based on the acquired distance value, and identify whether the identified obstacle is an obstacle for climbing.

Alternatively, location information of an obstacle for climbing may be stored in a memory in advance according to an example. For example, map information corresponding to a running space may be stored in a memory, and map information corresponding to the running space may include location information (for example, coordinate information) and type information (climbing target or avoidance target) of the obstacle. The controller 140 may identify whether an obstacle for climbing is present on a running route based on location information on a running map of the robot 100 and location information on an obstacle for climbing.

According to one or more embodiments, when it is identified that an obstacle for climbing is present on the running route in operation S420-Y, the controller 140 may control the second driver 130 so that both wheels 11 are eccentrically rotated around a second rotation axis in operation S430. For example, the controller 140 may eccentrically rotate the wheel 11 by 180 degrees with respect to a second rotation axis existing at a location spaced apart from the center of the wheel by a predetermined distance, and may shift the wheel 11 from an existing location by a predetermined distance in a running direction. Here, the preset distance means the distance between the center of the wheel before rotation and the center of the wheel after the rotation of the wheel, when the center of the wheel is shifted in the running direction by a distance that is twice the distance between the first rotation axis and the second rotation axis as the wheel 11 is eccentrically rotated by 180°.

Alternatively, the controller 140 may control the second driver 130 such that any one of the two wheels 11 is eccentrically rotated around a second rotation axis when it is identified that the obstacle exists on the running route. For example, the controller 140 may control the second driver 130 such that the left wheel is eccentrically rotated with respect to the second rotation axis.

Then, according to one or more embodiments, the controller 140 may control the first driver 120 so as to rotate the wheels 11 on both sides with respect to the first rotation axis, thereby climbing the obstacle in operation S440. According to one or more embodiments, the controller 140 may control the first driver 120 to rotate two wheels 11 based on a first rotation axis in a state in which both wheels 11 are rotated by a preset angle with respect to a second rotation axis.

In this case, the control method may control only the first driver 120 in order to perform the climbing, but is not limited thereto, and may control each of the first driver 120 and the second driver 130. For example, the controller 140 may control the second driver 130 to rotate the wheels 11 on both sides with respect to the second rotation axis while controlling the first driver 120 to rotate the wheels 11 on both sides with respect to the first rotation axis. Accordingly, on both side wheels 11, the center of the wheel rotates around a rotation axis (a first rotation axis) and at the same time rotates around a second rotation axis, thereby more effectively performing climbing.

Then, according to one or more embodiments, the controller 140 may determine whether the robot 100 climbs in operation S450. According to one or more embodiments, the controller 140 may identify whether an obstacle may be climbed in a state in which the left wheel and the right wheel 11 are shifted based on the location information of the robot 100 in the running space and/or the sensing data acquired through the sensor unit 110.

The location information of the robot 100 is coordinate information corresponding to the location of the robot 100 on the running map. According to one or more embodiments, information on a running map may be stored in a memory, and the controller 140 may identify relative location information (or coordinate information) of the robot 100 in the running map. According to one or more embodiments, the sensor unit 110 may include a motion sensor, and the control method may identify location information of the robot 100 in the running map by using odometry. "Odometry" refers to a method for obtaining information on a location change over time of the robot 100 by using data (for example, motion information and rotation information of a wheel) of a motion sensor.

According to an example, the controller 140 may identify that, based on identifying that the robot does not move for a preset time based on at least one of location information in a running map corresponding to a running space of the robot or rounds per minute (RPM) information of both wheels 11, the robot 100 is not capable of climbing the obstacle.

According to one or more embodiments, the sensor unit 110 may include at least one of a proximity sensor or an encoder, and the controller 140 may obtain RPM information of both wheels 11 through a proximity sensor or a rotary encoder.

According to one or more embodiments, the controller 140 may identify that the robot 100 does not climb the obstacle when it is identified that the robot 100 does not move for a preset time based on sensing data obtained from the sensor unit 110, for example, location data, distance data with an obstacle, and the like. That is, if there is no change in the location of the robot 100 at a location that the robot may not climb the obstacle, the controller 140 may identify that the robot 100 has failed to climb the obstacle. In some cases, the robot 100 may identify that the robot 100 does not move for a predetermined time at a location where the robot 100 does not climb the obstacle, and may identify that the robot 100 does not climb the obstacle when the RPM magnitude is greater than or equal to a preset value. Subsequently, according to one or more embodiments, the controller 140 may control the first driver 120 such that the robot 100 returns to a normal location in the running route when it is identified that the robot 100 climbs the obstacle in operation S460.

According to one or more embodiments, if it is identified that the robot 100 may not climb the obstacle (S450-N), the controller 140 may perform a crawling operation by controlling the second driver 130 in operation S470.

Here, the crawling means an operation in which both wheels 11 provided in the robot 100 rotate eccentrically for different time intervals through the second driver 130, that is, an operation in which the two wheels are eccentrically rotated alternately and/or eccentrically rotated at different angles.

According to one or more embodiments, the controller 140 may perform a crawling operation by eccentrically rotating both side wheels 11 for different time intervals through the second driver 130.

On the other hand, according to one example, the controller 140 may control the first driver 120 while performing a crawling operation to rotate the wheel 11 around the first rotation center. For example, while the crawling operation is performed, the controller 140 may control the first driver 120 to rotate the wheel 11 around the first rotation center, thereby performing eccentric rotation as well as center rotation through the first driver 120 at the same time. This will be described in detail with reference to FIGS. 6A and 6B.

Then, according to one or more embodiments, the controller 140 may control at least one of the first driver 120 or the second driver 130 to perform climbing of the obstacle in operation S440, and then determine again whether the robot 100 has climbed the obstacle in operation S450. For example, whether or not the robot has climbed may be determined again based on location information of the robot 100, distance information with an obstacle, and the like. When it is determined that the robot 100 has climbed the obstacle, the controller 140 may control the first driver 120 to return to a normal location in the running route and make the robot 100 run in operation S460.

Figure 5A:
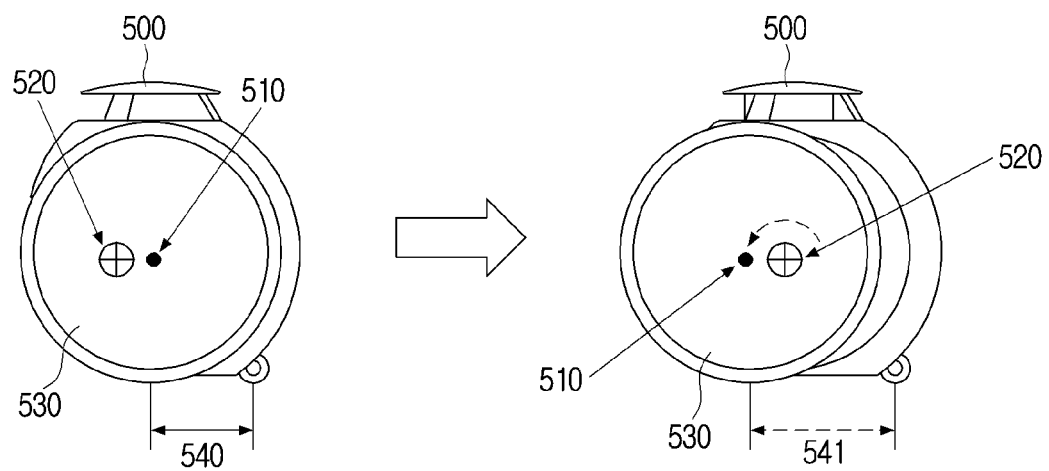
FIG. 5A is a diagram illustrating a method of eccentrically rotating a wheel according to one or more embodiments.

FIG. 5A is a diagram illustrating a method of eccentrically rotating a wheel according to one or more embodiments.

According to one or more embodiments, the controller 140 may control the second driver 130 such that both wheels 11 provided in the body portion 15 are shifted when an obstacle for climbing is identified on a running route. For example, when the robot 100 approaches within a preset distance from an obstacle for climbing, the controller 140 may control the second driver 130 so that both wheels 11 are shifted.

According to an example, the controller 140 may, based on identifying an obstacle for climbing on the running route based on sensing data obtained through the sensor unit 110, eccentrically rotate the left wheel and the right wheel 11 with respect to the second rotation axis so that the left wheel and the right wheel 11 are shifted forward with respect to the body portion 15. In addition, according to an example, the controller 140 may control the second driver 130, based on the left wheel and the right wheel 11 being shifted by a predetermined interval or a preset rotation angle with respect to an original location, to stop the eccentric rotation. In this case, according to one example, the controller 140 may identify a rotation angle at which both wheels 11 are eccentrically rotated with respect to a second rotation axis, and identify whether both wheels 11 are shifted by a predetermined interval with respect to a previous location (or an original location) before the eccentric rotation is performed based on the identified rotation angle.

Here, the interval described above may be calculated based on the center of both wheels 11, and the preset interval may be, for example, the distance between the center location of both wheels 11 after rotation of both wheels 11 by 180° based on a second rotation axis and the center location of both wheels 11 before rotation of both wheels 11.

Alternatively, according to one example, the interval described above may be the size 540 of the wheel base. According to one or more embodiments, the controller 140 may control the second driver 130 such that the size 541 of the wheel base is equal to or greater than a predetermined interval.

Referring to FIG. 5A, according to one embodiment, the controller 140 may control the first driver 120 to rotate a wheel 530 based on a first rotation axis 510 (i.e., the center location of the wheel 530) when an obstacle for climbing is not identified on the running route based on the sensing data acquired through the sensor unit 110.

Then, according to one embodiment, the controller 140 may control the second driver 130 such that both wheels 530 provided in the body part 15 are shifted when an obstacle for climbing is identified on the running route based on the sensing data acquired through the sensor unit 110.

According to an example, the controller 140 may, based on identifying an obstacle for climbing on the running route based on sensing data obtained through the sensor unit 110, eccentrically rotate both wheels 530 with respect to the second rotation axis 520 so that the both wheels 530 are shifted forward with respect to the body portion 15.

According to an example, the controller 140 may control the second driver 130, based on the both wheels 530 being shifted by a predetermined interval or a preset rotation angle with respect to a location before eccentric rotation of the both wheels 530 or an original location, to stop the eccentric rotation.

For example, the controller 140 may calculate a distance value between a center location of both wheels 530 after rotation by 180° with respect to a second rotation axis and a center location of both wheels 530 before rotation, and control the second driver 130 to stop eccentric rotation when the calculated distance value is identified as being equal to or greater than a preset interval size. However, the embodiment is not limited thereto, and the size of an angle at which both wheels rotate around a second rotation axis may vary according to a user setting.

When both wheels are rotated by a predetermined angle with respect to a second rotation axis according to the above-described example, rotated both wheels 530 are shifted forward with respect to the body part 15. Accordingly, the wheel base of the robot 100 has a relatively larger value compared to before the wheel is shifted, and accordingly, the robot 100 may more stably climb the obstacle.

Figure 5B:
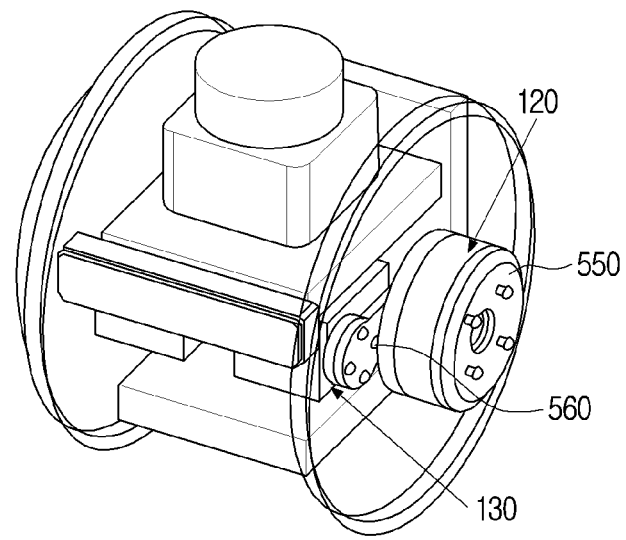
FIG. 5B is a diagram illustrating an operation mechanism of a robot according to one or more embodiments.
Figure 5B:
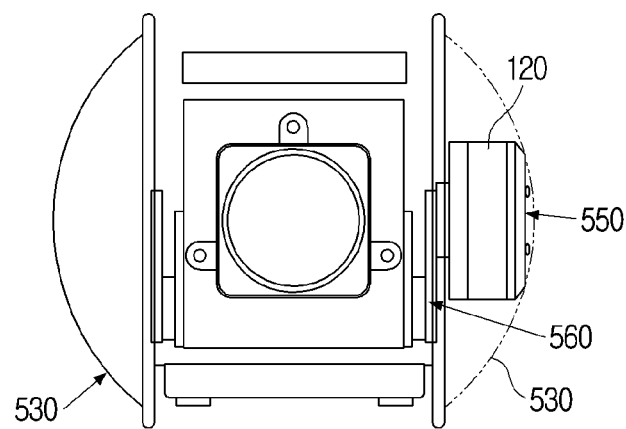
Figure 5C:
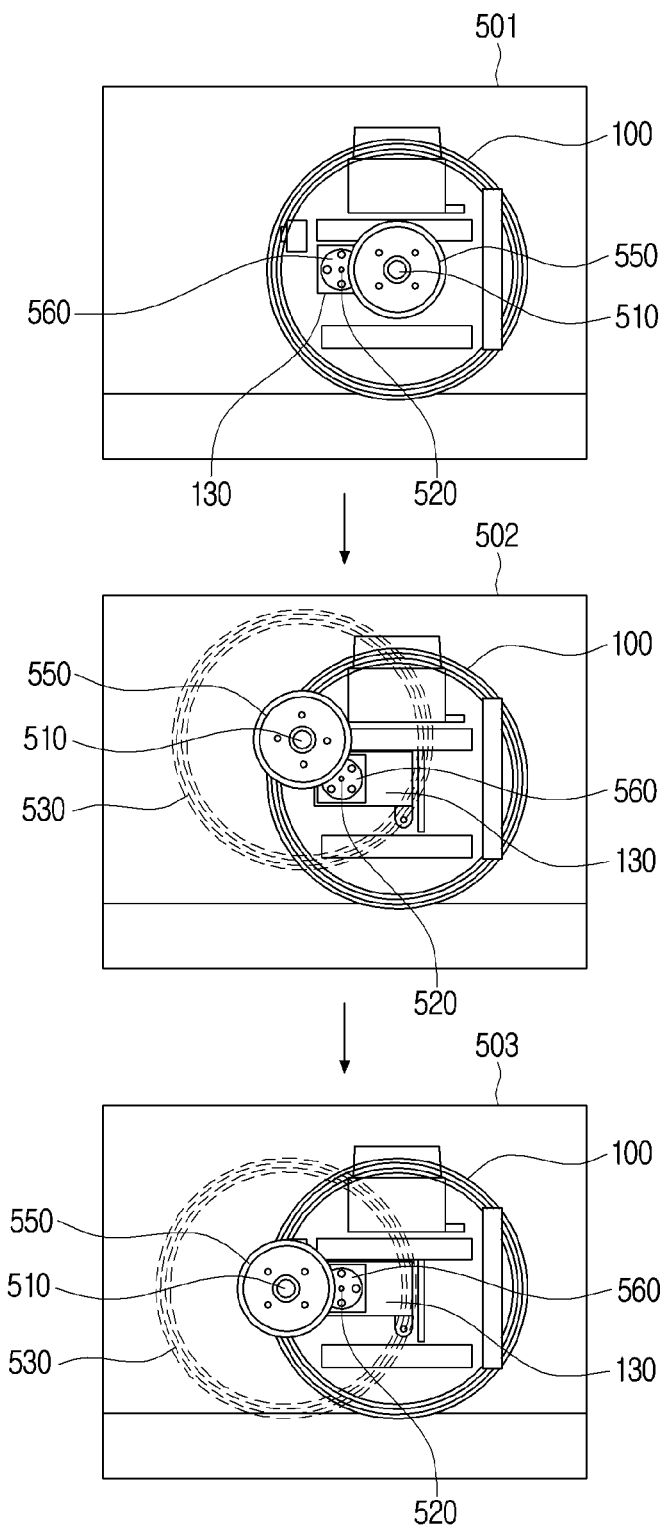
FIG. 5C is a diagram illustrating an operation mechanism of a robot according to one or more embodiments.

FIGS. 5B and 5C are diagrams illustrating an operation mechanism of a robot according to one or more embodiments.

Referring to FIG. 5B, according to one or more embodiments, the robot 100 may include the body portion 15, the first driver 120, the second driver 130, a coupling portion 550, and a connection member 560.

The coupling portion 550 may be provided on both sides of the body portion 15, respectively. According to one or more embodiments, a first driver 120 may be coupled to one side of the coupling portion 550, and the wheel 530 may be coupled to the remaining one side of the coupling portion 550. However, the present disclosure is not limited thereto.

The connection member 560 may be provided on both sides of the body portion 15, respectively. According to one or more embodiments, a first driver 120 may be coupled to one side of the connection member 560, and the second driver 130 may be coupled to the remaining one side of the connection member 560. However, the embodiment is not limited thereto.

On the other hand, according to one or more embodiments, the controller 140 may control the first driver 120 to rotate the wheel 530. According to one or more embodiments, the center of the wheel 530 may be located on the rotation axis 510 (i.e., the first rotation axis) of the first driver 120. When the controller 140 controls the first driver 120 to rotate the first driver 120 with respect to the first rotation axis 510, the coupling portion 550 coupled to the first driver 120 is also rotated with respect to the rotation axis 510 of the first driver 120, and thus the wheel 530 coupled to the coupling portion 550 is also rotated around the rotation axis 510 of the first driver 120. That is, when the first driver 120 rotates around the first rotation axis 510, the wheel 530 rotates around the center of the wheel located on the first rotation axis 510 as a rotation axis.

According to one or more embodiments, the controller 140 may control the second driver 130 to rotate the wheel 530. According to one or more embodiments, when the controller 140 controls the second driver 130 to rotate the second driver 130 with respect to the rotation axis (520, or the second rotation axis) of the second driver 130, the connection member 560 coupled to the second driver 130 also rotates around the second rotation axis 520, and accordingly, the first driver 120 coupled to one side of the connection member 560 is also rotated around the second rotation axis 520. When the first driver 120 rotates around the second rotation axis 520, the coupling portion 550 coupled to one side of the first driver 120 and the wheel 530 coupled to the remaining one side of the coupling portion 550 are also rotated around the second rotation axis 520.

On the other hand, referring to FIG. 5C, according to one or more embodiments, a rotation axis of the second driver 130 may be provided at a location spaced apart from the rotation axis 510 of the first driver 120 by a predetermined distance. According to one or more embodiments, the rotation axis (520, or the second rotation axis) of the second driver 130 is provided at a location spaced apart by 10 cm from the center of the wheel, and the second driver 130 may rotate the left wheel and the right wheel 530 with respect to the rotation axis 520 corresponding to the provided location.

According to an example, the controller 140 may control the second driver 130 such that the left wheel and the right wheel 530 are eccentrically rotated with respect to the second rotation axis 520, and shift the left wheel and the right wheel 530 in a direction in which a size of a wheel base of the robot 100 increases with respect to the body portion 15 (e.g., FIG. 1). For example, when an obstacle is identified on a running route, the controller 140 may control the second driver 130 to shift the left wheel and the right wheel 530 in a direction in which the size of a wheel base of the robot 100 increases with respect to the body portion 15 as illustrated in FIG. 5C. When the wheel is shifted 503, the location of the center of the wheel (or the center of the wheel corresponding to the first rotation axis 510) with respect to the body portion 15 may be different from the location of the center of the wheel 501 before the wheel is shifted.

Referring back to FIG. 2, according to one or more embodiments, when the robot 100 does not climb the obstacle, the controller 140 may control the second driver 130 to rotate only one of the two wheels 11 for a different time period.

According to an example, the controller 140 may first identify whether a left wheel and a right wheel 11 have climbed in a state in which the left wheel and the right wheel 11 are shifted, based on location information in the running space of the robot 100 or sensing data acquired through the sensor unit 110.

The controller 140 may identify that, based on at least one of location information in a running map corresponding to a running space of the robot or rounds per minute (RPM) information of both wheels, the robot has climbed the obstacle. For example, based on identifying that the robot 100 does not move for a preset time at a location where the robot 100 could not climb the obstacle, it may be identified that the robot 100 is not capable of climbing the obstacle.

When it is identified that the robot 100 could not climb the obstacle according to an example, the controller 140 may control the second driver 130 such that any one of the left wheel and the right wheel 11 is eccentrically rotated during the first time interval with respect to the second rotation axis. Here, according to one or more embodiments, the first time interval may be a time interval from when the robot 100 is identified as not climbing the obstacle to a time point when a preset time (for example, two seconds) has elapsed. For example, the second driver 130 may include a motor corresponding to the left wheel and a motor corresponding to the right wheel, and the controller 140 may alternately control the motor corresponding to the left wheel and the motor corresponding to the right wheel to control any one of the left wheel and the right wheel to eccentrically rotate.

For example, the controller 140 may control the second driver 130 so that the left wheel eccentrically rotates with respect to the second rotation axis for two seconds from the time when the robot 100 is identified as not climbing the obstacle.

Next, according to one or more embodiments, the controller 140 may control the second driver 130 such that the other one of the left wheel and the right wheel 11 is eccentrically rotated during a second time interval after the first time interval with respect to the second rotation axis. Here, according to one or more embodiments, the second time interval may refer to a time interval from when a first time interval has elapsed to a point in time when a preset time (for example, 2 seconds) has elapsed.

For example, the controller 140 may control the second driver 130 such that, when the robot 100 is identified to not climb the obstacle and the left wheel eccentrically rotates around a second rotation axis for two seconds, the right wheel is eccentrically rotated around a second rotation axis for two seconds from a time point when the first time interval elapses.

On the other hand, according to one or more embodiments, the controller 140 may control the second driver 130 such that both wheels 11 are eccentrically rotated at different rotation angles with respect to a second rotation axis when the robot 100 does not climb the obstacle.

Here, the rotation angle is an angle formed by a straight line connecting the second rotation center (or the center of the second rotation axis) and the first rotation center (or the center of the first rotation axis) and a straight line leading the foot of the perpendicular line having the second rotation center and the second rotation center on the floor surface. As both side wheels 11 are eccentrically rotated around a second rotation axis, the size of the rotation angle of both side wheels 11 is changed.

According to one or more embodiments, the controller 140 may control the second driver 130 such that the rotation angle (or the rotation angle of the first rotation center of the left wheel) of the left wheel is eccentrically rotated at a different rotation angle by the rotation angle (or the rotation angle of the first rotation center of the left wheel) of the left wheel. As described above, the robot 100 may attempt an obstacle climbing again by performing a crawling operation.

Figure 6A:
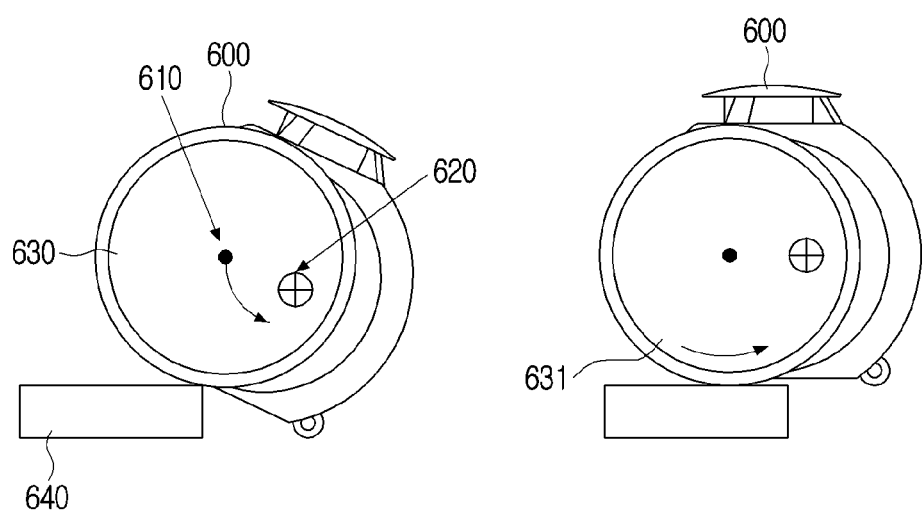
FIGS. 6A and 6B are diagrams illustrating a method of controlling when a robot cannot climb an obstacle according to one or more embodiments.
Figure 6B:
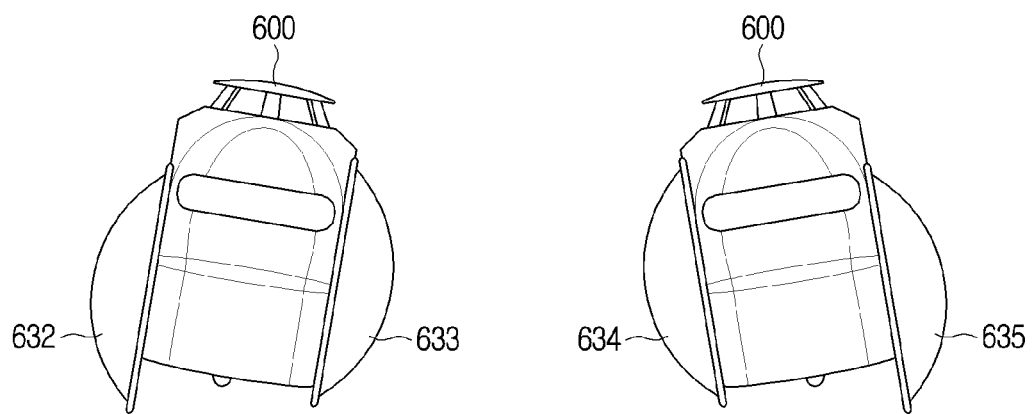

FIGS. 6A and 6B are diagrams illustrating a method of controlling when a robot cannot climb an obstacle according to one or more embodiments.

According to FIG. 6A, when the robot 100 does not climb an obstacle, the controller 140 may control the first driver 120 and the second driver 130 so that only one of the two wheels 11 rotates during a different time period.

According to an example, if a robot 600 cannot climb the obstacle, the controller 140 may first eccentrically rotate the left wheel with respect to the second rotation axis 620 during a preset time interval (a first time interval). In this case, according to one or more embodiments, the controller 140 may control the first driver 120 such that the left wheel rotates around the first rotation axis 610 while the left wheel eccentrically rotates around the second rotation axis 620. That is, when the robot 600 does not climb the obstacle, the robot 600 may perform crawling by simultaneously performing center rotation and eccentric rotation.

Then, according to one or more embodiments, when the first time interval has elapsed, the controller 140 may eccentrically rotate the right wheel with respect to the second rotation axis 620 during a preset time interval (a second time interval). In this case, according to one or more embodiments, the controller 140 may control the first driver 120 such that the right wheel rotates around the first rotation axis 610 while the right wheel rotates eccentrically with respect to the second rotation axis 620.

However, the embodiment is not limited thereto, and according to one or more embodiments, the controller 140 may eccentrically rotate any one of both wheels with respect to the second rotation axis 620, and then center-rotate any one of both wheels with respect to the first rotation axis 610. Here, the center rotation means that any one of both wheels rotates with respect to the first rotation axis 610.

For example, first, when it is identified that the robot 600 cannot climb the obstacle, the controller 140 may control the second driver 130 so that the left wheel is rotated by a preset angle with respect to the second rotation axis 620. After the left wheel is rotated by a preset angle with respect to the second rotation axis 620, the controller 140 may control the first driver 120 so that the left wheel rotates around the first rotation axis 610.

Then, when it is identified that the left wheel has been rotated during the first time interval, the controller 140 may control the second driver 130 so that the right wheel rotates by a preset angle with respect to the second rotation axis 620. After the right wheel is rotated by a preset angle with respect to the second rotation axis 620, the controller 140 may control the first driver 120 so that the right wheel rotates around the first rotation axis 610.

Referring to FIG. 6B, according to one or more embodiments, the controller 140 may control the second driver 130 such that both wheels are rotated for different time intervals. According to one or more embodiments, when it is identified that the robot 600 cannot climb the obstacle, the controller 140 may eccentrically rotate a right wheel 632 with respect to the second rotation axis 620 during a first time interval. In this case, a left wheel 633 may not rotate eccentrically during the first time interval.

Then, after a first time interval elapses, the controller 140 may eccentrically rotate the left wheel 635 with respect to the second rotation axis 620 during a second time interval. In this case, the left wheel 635 may not rotate eccentrically during the second time interval.

Alternatively, according to one embodiment, the controller 140 may control any one of the first driver 120 and the second driver 130 so that each of the two wheels 11 rotates during the same time interval when the robot 600 may not climb the obstacle in a state in which the left wheel and the right wheel 11 are shifted based on the acquired sensing data or the location information in the running space.

If the obstacle is not climbed in a state where the left wheel and the right wheel 11 are shifted, the controller 140 may control the second driver 130 so that the both wheels 11 are eccentrically rotated at the same rotation angle with respect to the second rotation axis.

That is, the robot 600 may perform climbing by driving only one of the two wheels 11, and may perform climbing by driving each of the two wheels 11 with the same operation.

Alternatively, according to one or more embodiments, the controller 140 may control at least one of the first driver 120 and the second driver 130 so that both side wheels 11 rotate around different rotation axes.

According to an example, if it is identified that the robot 600 cannot climb the obstacle, the controller 140 may control the first driver 120 to rotate around a first rotation axis, and the other one of the two-sided wheels 11 may control the second driver 130 to rotate around a second rotation axis.

Alternatively, according to one example, the controller 140 may control the first driver 120 and the second driver 130 so that both side wheels 11 rotate around each of the first rotation axis and the second rotation axis. That is, the wheel is not necessarily driven based on only one rotation axis.

Accordingly, even if climbing is not performed using shifting of both wheels, the robot 600 may perform the above-described crawling operation to climb the obstacle.

Figure 7:
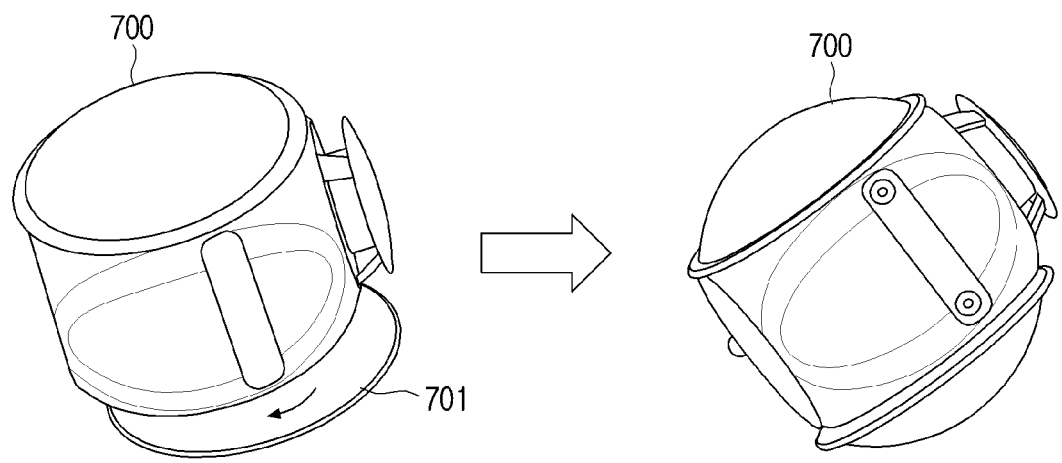
FIG. 7 is a diagram illustrating a controlling method when a robot is overturned according to one or more embodiments.

FIG. 7 is a diagram illustrating a controlling method when a robot is overturned according to one or more embodiments.

Referring to FIG. 7, according to one or more embodiments, the controller 140 may identify whether the robot 700 is overturned based on sensing data acquired through the sensing unit 110. According to one or more embodiments, the sensor unit 110 may include an inertial measurement unit (IMU) sensor, and the controller 140 may acquire data on the degree of tilt of the robot 700 through the IMU sensor. The controller 140 may identify whether the robot 700 is overturned based on sensing data acquired through the IMU sensor.

Then, if the robot 700 is identified to be overturned, the controller 140 may control the second driver 130 such that at least one of the left wheel and the right wheel rotates at a preset number of times and a preset angular speed based on a second rotation axis, according to one or more embodiments. Based on identifying that the robot 700 is overturned in a direction of the left wheel 701 based on the sensing data, the controller 140 may control the second driver 130 so that the left wheel 701 rotates at a preset number of times and a preset angular speed with respect to the second rotation axis.

After a left wheel 701 rotates at a preset number of times and at a preset angular speed, the controller 140 may identify whether the robot 700 is in a state before the robot 700 is overturned, based on the sensing data acquired through the IMU sensor according to one or more embodiments. According to one or more embodiments, the controller 140 may control the first driver 120 such that the robot 700 runs a running route when it is identified that the robot 700 is in a state before the robot 700 is overturned. According to an example, if it is identified that the overturning of the robot 700 is maintained, the controller 140 may control the second driver 130 so that the left wheel 701 rotates at a preset number of times and a preset angular speed. That is, the controller 140 may rotate the left wheel 701 until the robot 700 becomes to be in a state before overturning.

According to an example above, the robot 100 may overcome the overturned state of the robot through eccentric rotation and may perform an efficient service.

Figure 8:
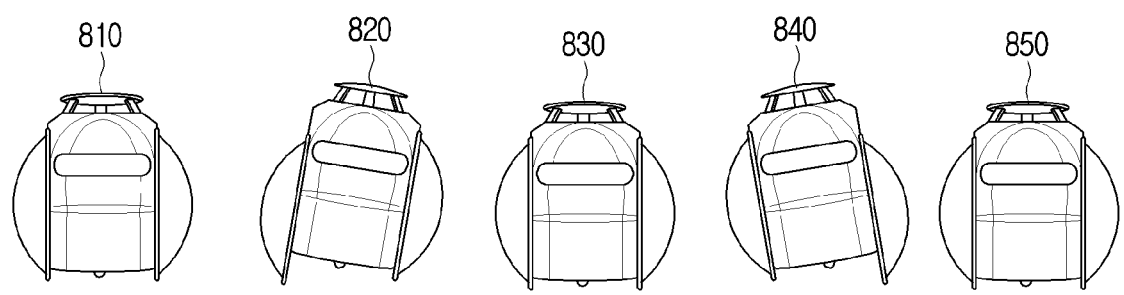
FIG. 8 is a diagram illustrating a method of performing an operation corresponding to an emotional expression by a robot according to one or more embodiments.

FIG. 8 is a diagram illustrating a method of performing an operation corresponding to an emotional expression by a robot according to one or more embodiments.

Referring to FIG. 8, according to one or more embodiments, the robot 100 may further include a memory in which operation information corresponding to the plurality of emotion expressions is stored. Here, the emotion expression may be at least one of, for example, being happy, sad, angry, bored, or calm. The operation information may be control information on both wheels corresponding to the emotion expression. For example, information on an eccentric rotation distance, an eccentric rotation angle, a running speed, a running distance, and the like of both wheels 11 respectively corresponding to different emotion expressions may be stored. In addition, LED light emitting information, haptic information, audio information, and the like may be mapped to and stored in each of different emotion expressions.

According to one or more embodiments, the controller 140 may, based on at least one emotion expression among the plurality of emotion expressions being identified according to a preset event, identify operation information corresponding to the identified at least one emotion expression based on the operation information stored in a memory; and control at least one of the first driver 120 or the second driver 130 based on the identified operation information.

According to an example, when an emotion expression corresponding to happiness is identified according to a preset event, the controller 140 may identify operation information corresponding to happiness based on the operation information stored in the memory.

Then, according to one or more embodiments, the controller 140 may control the first driver 120 and the second driver 130 to perform a series of operations (810 to 850) corresponding to the mechanism, as shown in FIG. 8, based on the operation information corresponding to the identified "happiness".

Accordingly, the robot 100 may express at least one emotion by eccentrically rotating both wheels.

Figure 9A:
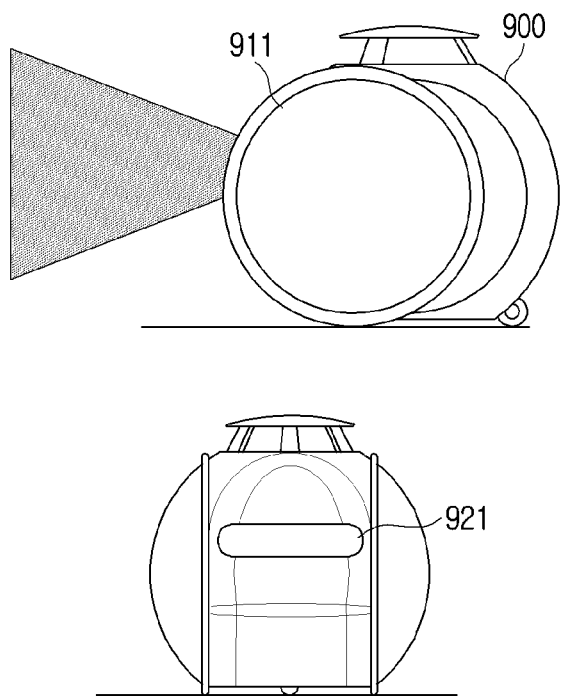
FIGS. 9A and 9B are diagrams illustrating a camera tilting effect of the disclosure according to one or more embodiments.
Figure 9B:
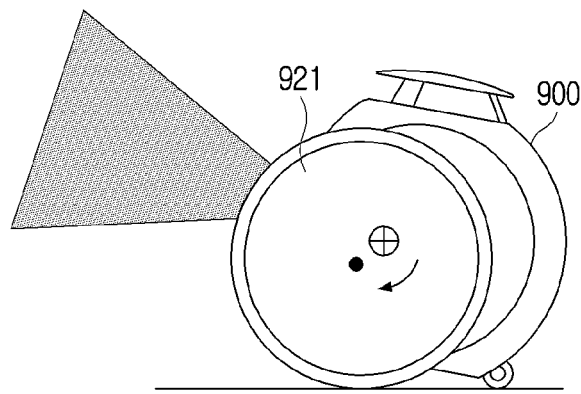
Figure 9B:
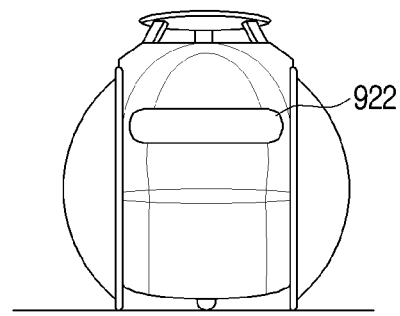

FIGS. 9A and 9B are diagrams illustrating a camera tilting effect of the disclosure according to one or more embodiments.

In the case of a conventional small robot capable of running, a separate human recognition camera is required together with a depth camera for running due to the shape of the robot. This is because the location of the sensor is relatively close to the ground in the case of a field-of-view securing sensor such as a camera provided in the robot, and thus it is difficult to secure an angle of view for recognizing a person only with the depth camera for running.

According to an example the controller 140 may change the viewing area of the sensor 110 provided in the robot 100 by eccentrically rotating both wheels 11.

According to an example, referring to FIG. 9A, the controller 140 may rotate both wheels 911 by a preset angle with respect to a second rotation axis to change a viewing area of a camera 921 provided in a robot 900. That is, the robot 900 rotates both wheels 911 by a predetermined angle on a second rotation axis so that the camera 921 may relatively secure a field of view corresponding to the upper portion. Alternatively, according to FIG. 9B, the controller 140 may control the second driver 130 to further rotate the two wheels 921 with respect to the second rotation axis as compared to the case of FIG. 9A so that the camera 922 may secure a more upper view than the case of FIG. 9A.

Accordingly, even for a robot for performing interaction with a person by recognizing a person (or an object) at a close distance, it is possible to secure a field of view of a running route and perform interaction with a person by using only one camera without having to have a driving source for changing an angle of view of the camera, thereby reducing costs.

Referring back to FIG. 2, according to one or more embodiments, the sensor unit 110 may include at least one of a camera and a LiDAR sensor, and the controller 140 may identify whether an obstacle for climbing is present on a running route based on at least one of an image acquired through a camera or data acquired through a LiDAR sensor.

According to an example, the controller 140 may identify whether an obstacle for climbing is present on the running route through the trained neural network model.

The one or a plurality of controllers 140 control the processing of the input data in accordance with a predefined operating rule or artificial intelligence (AI) model stored in the memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to one or more embodiments is performed, and/or may be implemented through a separate server/system.

According to an example, the robot 100 may further include a memory storing a trained neural network model. The AI model may consist of a plurality of neural network layers. Each layer has a plurality of weight values, and performs a layer operation through calculation of a previous layer and an operation of a plurality of weights. Examples of neural networks include convolutional neural network (CNN), deep neural network (DNN), recurrent neural network (RNN), restricted Boltzmann Machine (RBM), deep belief network (DBN), bidirectional recurrent deep neural network (BRDNN), deep Q-networks, and transformer and are not limited thereto unless otherwise specified.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning, and the learning algorithm in this disclosure is not limited thereto unless otherwise specified.

According to an example, the controller 140 may input at least one of an image acquired through a camera or data acquired through a LiDAR sensor to a trained neural network model to identify whether an obstacle for climbing is present on a running route.

In this case, according to one or more embodiments, the neural network model may be trained by using, as learning data, an image of a running route of the robot 100 acquired through a camera and information on whether an obstacle for climbing in an image corresponding to the image is present as learning data. Alternatively, according to one or more embodiments, the neural network model may be trained by using, as learning data, data acquired through the LiDAR sensor and data on whether an obstacle for climbing is present corresponding thereto.

Figure 10:
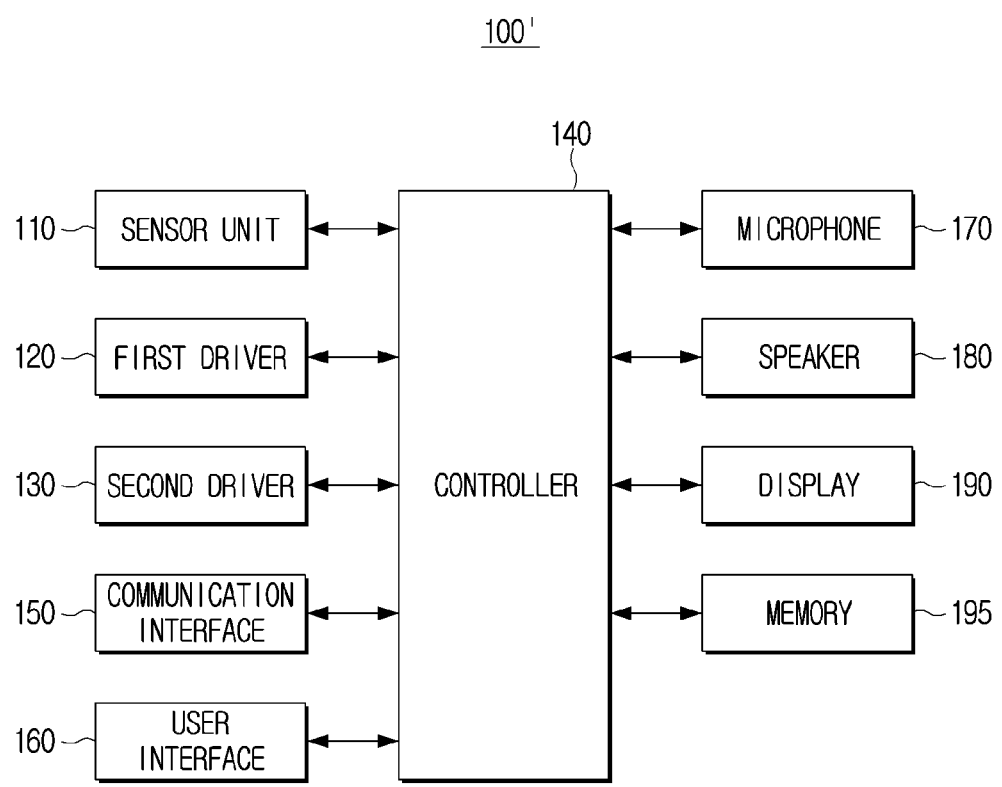
FIG. 10 is a block diagram illustrating a specific configuration of a robot according to one or more embodiments.

FIG. 10 is a block diagram illustrating a specific configuration of a robot according to one or more embodiments.

Referring to FIG. 10, a robot 100' may include the sensor unit 110, the first driver 120, the second driver 130, the controller 140, the communication interface 150, the user interface 160, a microphone 170, a speaker 180, a display 190, and a memory 195. The features of FIG. 10 which overlap the features of FIG. 2 will not be described in detail.

The communication interface 150 may communicate with an external device. For example, the communication interface 150 may receive an image signal by streaming or downloading from an external device (for example, a source device), an external storage medium (for example, a universal serial bus (USB) device), an external server (for example, a web hard) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

The user interface 160 may be implemented as a device such as a button, a touch pad, a mouse, and a keyboard, or may be implemented as a touch screen, a remote controller transmission/reception unit, and the like, which may also perform the above-described display function and operation input function. The remote controller transmission and reception unit may receive a remote control signal from an external remote control device or transmit a remote control signal from an external remote control device through at least one of infrared communication, Bluetooth communication, and Wi-Fi communication.

The microphone 170 may refer to a module for acquiring a sound and converting the sound into an electrical signal, and may be a condenser microphone, a ribbon microphone, a moving coil microphone, a piezoelectric element microphone, a carbon microphone, and a Micro Electro Mechanical System (MEMS) microphone. In addition, it may be implemented in the manner of omnidirectional, bi-directional, unidirectional, sub-cardioid, super cardioid, hyper cardioid.

The speaker 180 may include a tweeter for playing a high-pitched sound band sound; a mid-range for playing a middle-range sound band sound; a woofer for playing a low-pitched sound band sound; a subwoofer for playing a very low-pitched sound band sound; an enclosure for controlling resonance; a crossover network for dividing an electric signal frequency inputted to the speaker for each band; and the like.

The speaker 180 may output an acoustic signal to the outside of the robot 100'. The speaker 180 may output multimedia playback, recording playback, various notification sounds, voice messages, and the like. The robot 100' may include an audio output device such as the speaker 180, but may include an output device such as an audio output terminal. In particular, the speaker 180 may provide obtained information, information processed/produced based on the obtained information, a response result or an operation result with respect to the user voice, and the like in a voice form.

The display 190 may be implemented as a display including a self-emitting element or a display including a non-self-limiting element and a backlight. For example, the display 190 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or the like. In the display 190, a backlight unit, a driving circuit which may be implemented as an a-si TFT, low temperature poly silicon (LTPS) TFT, organic TFT (OTFT), or the like, may be included as well. The display 190 may be implemented as a touch screen coupled to a touch sensor, a flexible display, a rollable display, a third-dimensional (3D) display, a display in which a plurality of display modules are physically connected, or the like. The processor or controller 140 may control the display 190 to output an output image that is obtained according to various embodiments described above. Here, the output image may be a high-resolution image of 4K, 8K or more.

The memory 195 may store data necessary for various embodiments of the disclosure. The memory 195 may be implemented as a memory embedded in the robot 100', or may be implemented as a removable or modular memory in the robot 100', according to the data usage purpose. For example, data for driving the robot 100' may be stored in a memory embedded in the robot 100', and data for an additional function of the robot 100' may be stored in the memory detachable to the robot 100'. A memory embedded in the robot 100' may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the robot 100', the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like, but the memory is not limited thereto.

According to various embodiments described above, the robot may shift the wheel to increase the wheel base, and thus, the robot may perform climbing without being overturned. Accordingly, the service performance capability of the robot is increased, thereby improving user satisfaction.

Also, the wheel may be shifted to change the angle of view of the depth camera. Accordingly, the robot does not need to include a separate camera for user interaction, thereby reducing costs.

The methods according to various embodiments of the disclosure described above may be implemented in the form of an application that may be installed in an existing robot. The methods according to various embodiments of the disclosure described above may be performed using a deep learning-based trained neural network (or a deep-learned neural network), that is, a learning network model. In addition, the methods according to various embodiments of the disclosure described above may be implemented by software upgrade or hardware upgrade for an existing robot. In addition, various embodiments of the disclosure described above may be performed through an embedded server provided in the robot or an external server of the robot.

According to one or more embodiments of the disclosure, the various embodiments described above may be implemented as software including instructions stored in a machine-readable storage media which is readable by a machine (e.g., a computer). The device may include the display apparatus (e.g., display apparatus A) according to the disclosed embodiments, as a device which calls the stored instructions from the storage media and which is operable according to the called instructions. When the instructions are executed by a processor or controller 140, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to one or more embodiments, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

In addition, each of the elements (e.g., a module or a program) according to various embodiments described above may be comprised of a single entity or a plurality of entities, and some sub-elements of the abovementioned sub-elements may be omitted, or different sub-elements may be further included in the various embodiments. Alternatively or additionally, some elements (e.g., modules or programs) may be integrated into one entity to perform the same or similar functions performed by each respective element prior to integration. Operations performed by a module, a program, or another element, in accordance with various embodiments, may be performed sequentially, in a parallel, repetitively, or in a heuristically manner, or at least some operations may be performed in a different order, omitted or a different operation may be added.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A robot comprising:
   a body portion;
   at least one sensor provided in the body portion;
   a first wheel and a second wheel provided on opposite sides of the body portion and configured to rotate;
   a first driver configured to rotate the first wheel and the second wheel with respect to a first rotation axis;
   a second driver configured to eccentrically rotate the first wheel and the second wheel with respect to a second rotation axis;
   memory storing at least one instruction; and
   at least one processor configured to execute the at least one instruction,
   wherein the at least one instruction, when executed by the at least one processor individually or collectively, causes the robot to:

control the first driver and the second driver to cause the robot to move along a route by rotating the first wheel and the second wheel, identify, based on sensing data obtained through the at least one sensor, an obstacle for climbing on the route, based on identifying the obstacle, control the second driver to eccentrically rotate the first wheel and the second wheel with respect to the second rotation axis, and to shift the first wheel and the second wheel in a direction from a first position to a second position to increase a size of a wheel base of the robot, and based on identifying that the robot does not move for a preset time based on at least one of location information in a running map corresponding to a running space of the robot or rounds per minute (RPM) information, identify that the robot is not capable of climbing the obstacle.

2. The robot of claim 1, wherein the at least one instruction, when executed by the at least one processor individually or collectively, further causes the robot to:

based on the first wheel and the second wheel being in the second position and identifying that that the obstacle is not climbed based on location information in a running space of the robot or sensing data acquired through the at least one sensor, control the second driver to eccentrically rotate the first wheel at a first rotation angle with respect to the second rotation axis, and eccentrically rotate the second wheel at a second rotation angle with respect to the second rotation axis.

3. The robot of claim 1, wherein the at least one instruction, when executed by the at least one processor individually or collectively, further causes the robot to, based on identifying the obstacle, control the second driver to shift the first wheel and the second wheel forward with respect to the body portion by eccentrically rotating the first wheel and the second wheel with respect to the second rotation axis, and stopping the eccentric rotation of the first wheel and the second wheel once the first wheel and the second wheel are shifted by a predetermined interval or a preset rotation angle with respect to the first position.

4. The robot of claim 1, wherein the at least one memory stores information about an operation corresponding to a plurality of emotion expressions, and wherein the at least one instruction, when executed by the at least one processor individually or collectively, further causes the robot to:

based on identifying at least one emotion expression among the plurality of emotion expressions according to a preset event, identify operation information corresponding to the at least one emotion expression based on the operation information stored in the at least one memory, and control at least one of the first driver or the second driver based on the operation information.

5. The robot of claim 1, wherein the at least one sensor comprises at least one of a camera or a light detection and ranging (LiDAR) sensor, and wherein the at least one instruction, when executed by the at least one processor individually or collectively, further causes the robot to, based on at least one of an image acquired through the camera and data acquired through the LiDAR sensor, identify whether an obstacle for climbing is present on the route.

6. The robot of claim 5, wherein the at least one memory stores a trained neural network model, and wherein the at least one instruction, when executed by the at least one processor individually or collectively, further causes the robot to identify whether the obstacle for climbing is present on the route by inputting at least one of the acquired image or the acquired data to the trained neural network model.

7. The robot of claim 1, wherein the at least one instruction, when executed by the at least one processor, further causes the robot to:

identify whether the robot is overturned based on sensing data acquired through the at least one sensor, and based on identifying that the robot is overturned, control the second driver to rotate at least one of the first wheel or the second wheel a preset number of times and at a preset angular speed with respect to the second rotation axis.

8. The robot of claim 1, wherein the first rotation axis corresponds to a central location of the first wheel and the second wheel, and wherein the second rotation axis corresponds to a location spaced apart from the center of the first wheel and the second wheel by a preset distance.

9. A method of controlling a robot comprising a body portion, first and second wheels provided on opposite sides of the body portion, a first driver, a second driver, and at least one sensor, the method comprising:

controlling at least one of the first driver and the second driver to cause the robot to move along a route by rotating the first wheel and the second wheel with respect to at least one of a first rotation axis or a second rotation axis of each of the first wheel and the second wheel;

identifying, based sensing data obtained through the at least one sensor, an obstacle for climbing on the route;

based on identifying the obstacle, controlling the second driver to eccentrically rotate the first wheel and the second wheel with respect to the second rotation axis, and shift the first wheel and the second wheel in a direction from a first position to a second position to increase in a size of a wheel base of the robot; and based on identifying, that the robot does not move for a preset time based on at least one of location information in a running map corresponding to a running space of the robot or rounds per minute (RPM) information, identifying that the robot is not capable of climbing the obstacle.

10. The method of claim 9, further comprising:

based on the first wheel and the second wheel being in the second position and identifying that that the obstacle is not climbed based on location information in a running space of the robot or sensing data acquired through the at least one sensor, controlling the second driver to eccentrically rotate the first wheel at a first rotation angle with respect to the second rotation axis, and eccentrically rotate the second wheel at a second rotation angle with respect to the second rotation axis.

11. The method of claim 9, wherein the controlling the second driver to shift the first wheel and the second wheel to the second position comprises controlling the second driver to shift the first wheel and the second wheel forward with respect to the body portion by eccentrically rotating the first wheel and the second wheel with respect to the second rotation axis, and stopping the eccentric rotation of the first wheel and the second wheel once the first wheel and the second wheel are shifted by a predetermined interval or a preset rotation angle with respect to the first position.

12. The method of claim 9, further comprising:
- based on identifying at least one emotion expression among a plurality of emotion expressions according to a preset event, identifying operation information corresponding to the identified at least one emotion expression based on operation information stored in at least one memory of the robot; and
- controlling at least one of the first driver or the second driver based on the operation information.

13. A non-transitory computer readable recording medium having instructions stored therein, which when executed by at least one processor of a robot, cause the at least one processor to perform a method of operating the robot comprising a body portion, first and second wheels provided on opposite sides of the body portion, a first driver, a second driver, and at least one sensor, the method comprising:
- controlling at least one of the first driver and the second driver to cause the robot to move along a route by rotating the first wheel and the second wheel with respect to at least one of a first rotation axis or a second rotation axis of each of the first wheel and the second wheel;
- identifying, based sensing data obtained through the at least one sensor, an obstacle for climbing on the route;
- based on identifying the obstacle, controlling the second driver to eccentrically rotate the first wheel and the second wheel with respect to the second rotation axis, and shift the first wheel and the second wheel in a direction from a first position to a second position to increase in a size of a wheel base of the robot; and
- based on identifying, that the robot does not move for a preset time based on at least one of location information in a running map corresponding to a running space of the robot or rounds per minute (RPM) information, identifying that the robot is not capable of climbing the obstacle.

14. The non-transitory computer readable medium of claim 13, wherein the method further comprises:
- based on the first wheel and the second wheel being in the second position and identifying that that the obstacle is not climbed based on location information in a running space of the robot or sensing data acquired through the at least one sensor, controlling the second driver to eccentrically rotate the first wheel at a first rotation angle with respect to the second rotation axis, and eccentrically rotate the second wheel at a second rotation angle with respect to the second rotation axis.

15. The non-transitory computer readable medium of claim 13, wherein the controlling the second driver to shift the first wheel and the second wheel to the second position comprises controlling the second driver to shift the first wheel and the second wheel forward with respect to the body portion by eccentrically rotating the first wheel and the second wheel with respect to the second rotation axis, and stopping the eccentric rotation of the first wheel and the second wheel once the first wheel and the second wheel are shifted by a predetermined interval or a preset rotation angle with respect to the first position.

16. The non-transitory computer readable medium of claim 13, wherein the method further comprises:
- based on identifying at least one emotion expression among a plurality of emotion expressions according to a preset event, identifying operation information corresponding to the identified at least one emotion expression based on operation information stored in at least one memory of the robot; and
- controlling at least one of the first driver or the second driver based on the operation information.

\* \* \* \* \*